United States Patent [19]
Clark

[11] Patent Number: 5,992,233
[45] Date of Patent: Nov. 30, 1999

[54] MICROMACHINED Z-AXIS VIBRATORY RATE GYROSCOPE

[75] Inventor: William A. Clark, Fremont, Calif.

[73] Assignee: The Regents of the University of California, Oakland, Calif.

[21] Appl. No.: 08/658,924

[22] Filed: May 31, 1996

[51] Int. Cl.[6] .................................................. G01P 15/08
[52] U.S. Cl. ............................. 73/514.35; 73/514.16; 73/514.32; 73/504.12; 361/280
[58] Field of Search ............................ 73/504.02, 504.13, 73/504.04, 504.12, 506, 509, 510, 511, 514.15, 514.16, 514.17, 514.18, 514.21, 514.36, 514.32, 514.35; 361/271, 272, 280

[56] References Cited

U.S. PATENT DOCUMENTS

| | | | |
|---|---|---|---|
| 5,025,346 | 6/1991 | Tang et al. | 361/283 |
| 5,203,208 | 4/1993 | Bernstein | 73/505 |
| 5,329,815 | 7/1994 | Dunn et al. | 73/505 |
| 5,345,824 | 9/1994 | Sherman et al. | 73/514.32 |
| 5,349,855 | 9/1994 | Bernstein et al. | 73/505 |
| 5,359,893 | 11/1994 | Dunn et al. | 73/505 |
| 5,377,544 | 1/1995 | Dunn et al. | 73/505 |
| 5,392,650 | 2/1995 | O'Brien et al. | 73/517 |
| 5,408,877 | 4/1995 | Greiff et al. | 73/505 |
| 5,417,111 | 5/1995 | Sherman et al. | 73/514.36 |
| 5,447,067 | 9/1995 | Biebl et al. | 73/514.32 |
| 5,447,068 | 9/1995 | Tang | 73/514.32 |
| 5,465,604 | 11/1995 | Sherman | 73/1 DV |
| 5,491,604 | 2/1996 | Nguyen et al. | 361/278 |
| 5,495,761 | 3/1996 | Diem et al. | 73/514.32 |
| 5,511,420 | 4/1996 | Zhao et al. | 73/514.18 |
| 5,541,437 | 7/1996 | Watanabe et al. | 257/417 |
| 5,563,343 | 10/1996 | Shaw et al. | 73/514.18 |
| 5,565,625 | 10/1996 | Howe et al. | 73/514.16 |
| 5,583,290 | 12/1996 | Lewis | 73/514.18 |
| 5,600,064 | 2/1997 | Ward | 73/504.04 |
| 5,600,065 | 2/1997 | Kar et al. | 73/504.12 |
| 5,610,334 | 3/1997 | Fima et al. | 73/504.12 |
| 5,627,317 | 5/1997 | Offenberg et al. | 73/514.32 |
| 5,627,318 | 5/1997 | Fujii et al. | 73/514.32 |

OTHER PUBLICATIONS

Y. Gianchandani, et al., "Micron–sized, High Aspect Ratio Bulk Silicon Micromechanical Devices", *Micro Electrical Systems*, pp. 208–212, Travemunde, Germany, Feb. 4–7, 1992.

W. Tang, et al., "Electrostatic Comb Drive Levitation and Control Method", *Journal of Electromechanical Systems*, vol. 1, No. 4, pp. 170–176, Dec. 1992.

J. Bernstein, et al., "A Micromachined Comb–Drive Tuning Fork Rate Gyroscope", *Digest IEEE/ASME Micro Electromechanical Systems, (MEMS) Workshop*, pp. 143–148, Ft. Lauderdale, FL, Feb. 1993.

J. Söderkvist, "Micromachined Gyroscopes", *Sensors and Actuators A*, vol. 43, pp. 65–71, 1994.

M. Putty, "A Micromachined Vibrating Ring Gyroscope", *Solid–State Sensor and Actuator Workshop*, pp. 213–220, Hilton Head, FL, Jun. 1994.

(List continued on next page.)

*Primary Examiner*—Hezron E. Williams
*Assistant Examiner*—Richard A. Moller
*Attorney, Agent, or Firm*—Fish & Richardson, P.C.

[57] ABSTRACT

A microfabricated gyroscope to measure rotation about an axis perpendicular to the surface of the substrate. The driving electrodes, X-axis sensing electrodes, and Y-axis sensing electrodes may all be fabricated from a signal structural layer. The gyroscope includes movable sensing electrode fingers which are positioned between paired stationary sensing electrode fingers. The position of the proof mass along the Y-axis is measured by a capacitive bridge. A voltage differential may be applied between the pairs of stationary electrode fingers to reduce the quadrature error, and a bias voltage may be applied between the movable and stationary electrode fingers to adjust the Y-axis resonant frequency.

44 Claims, 10 Drawing Sheets

OTHER PUBLICATIONS

B. Johnson, "Vibrating Rotation Sensors", International Congress and Exposition, SAE SP–1066, pp. 41–47, 1995.

K. Tanaka, et al., "Vibrating Silicon Microgyroscope", *Technical Digest of the 13th Sensor Symposium*, pp. 185–188, Japan, 1995.

J. Choi, et al., "Silicon Resonant Angular Rate Sensor by Reactive Ion Etching", *Technical Digest of the 13th Sensor Symposium*, pp. 177–180, Japan, 1995.

P. Ljung, et al., "Micromachined Two Input Axis Angular Rate Sensor", ASME Dynamic Systems and Control Division, pp. 957–962, San Francisco, CA, Nov. 1995.

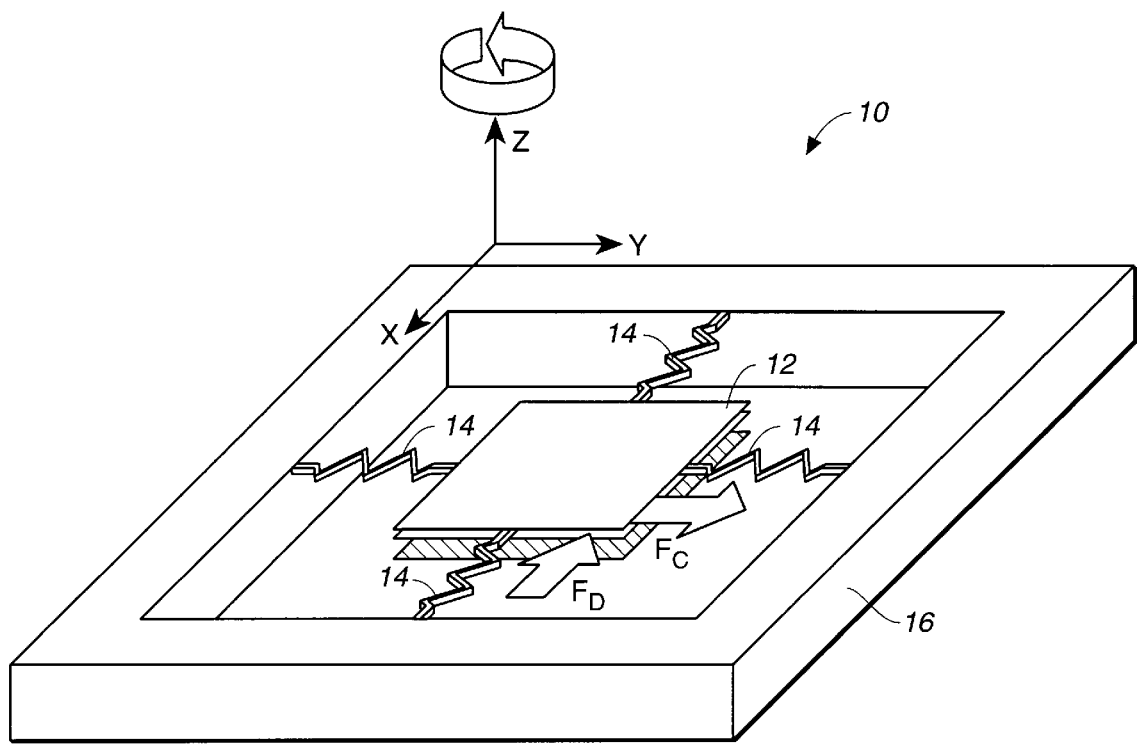
FIG._1

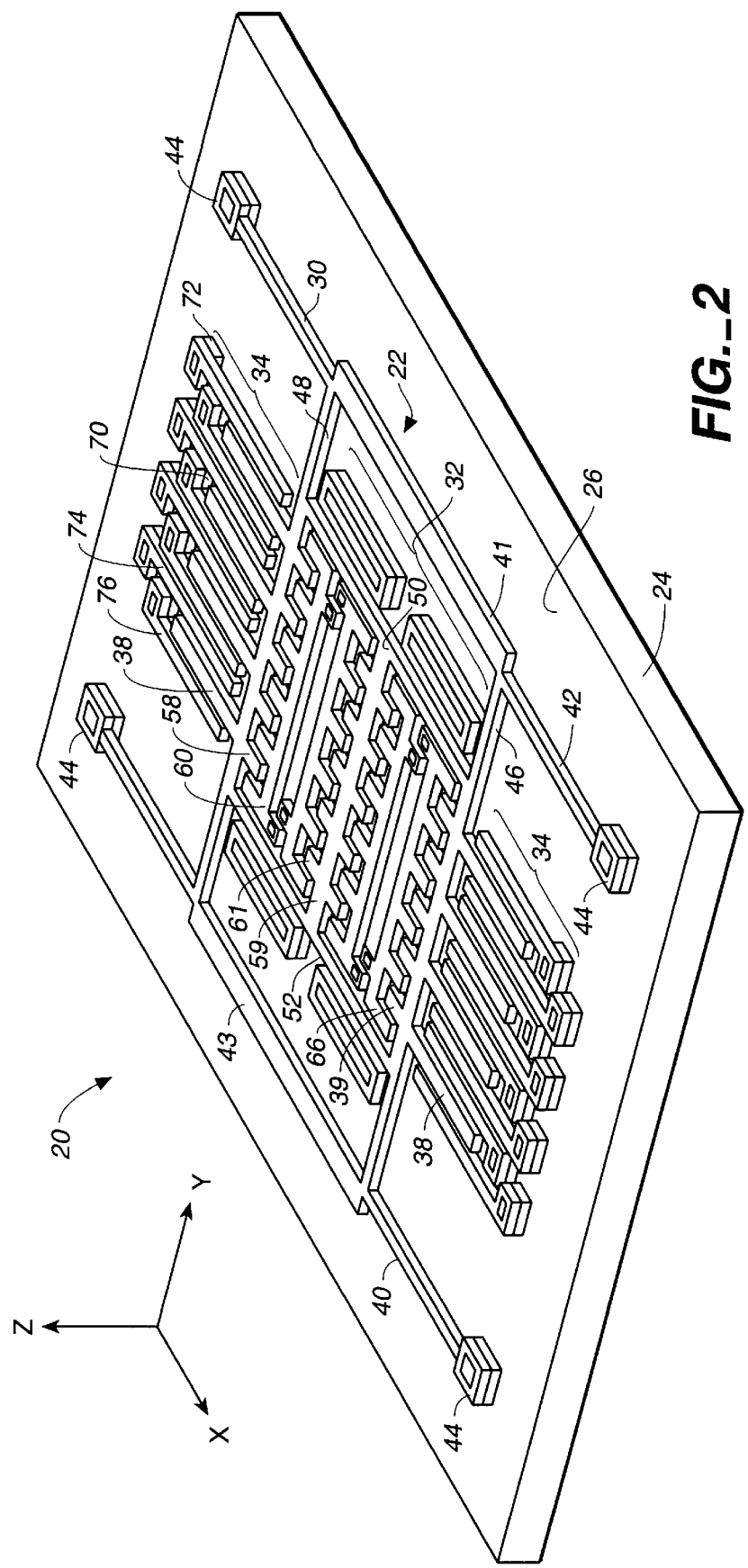
FIG._2

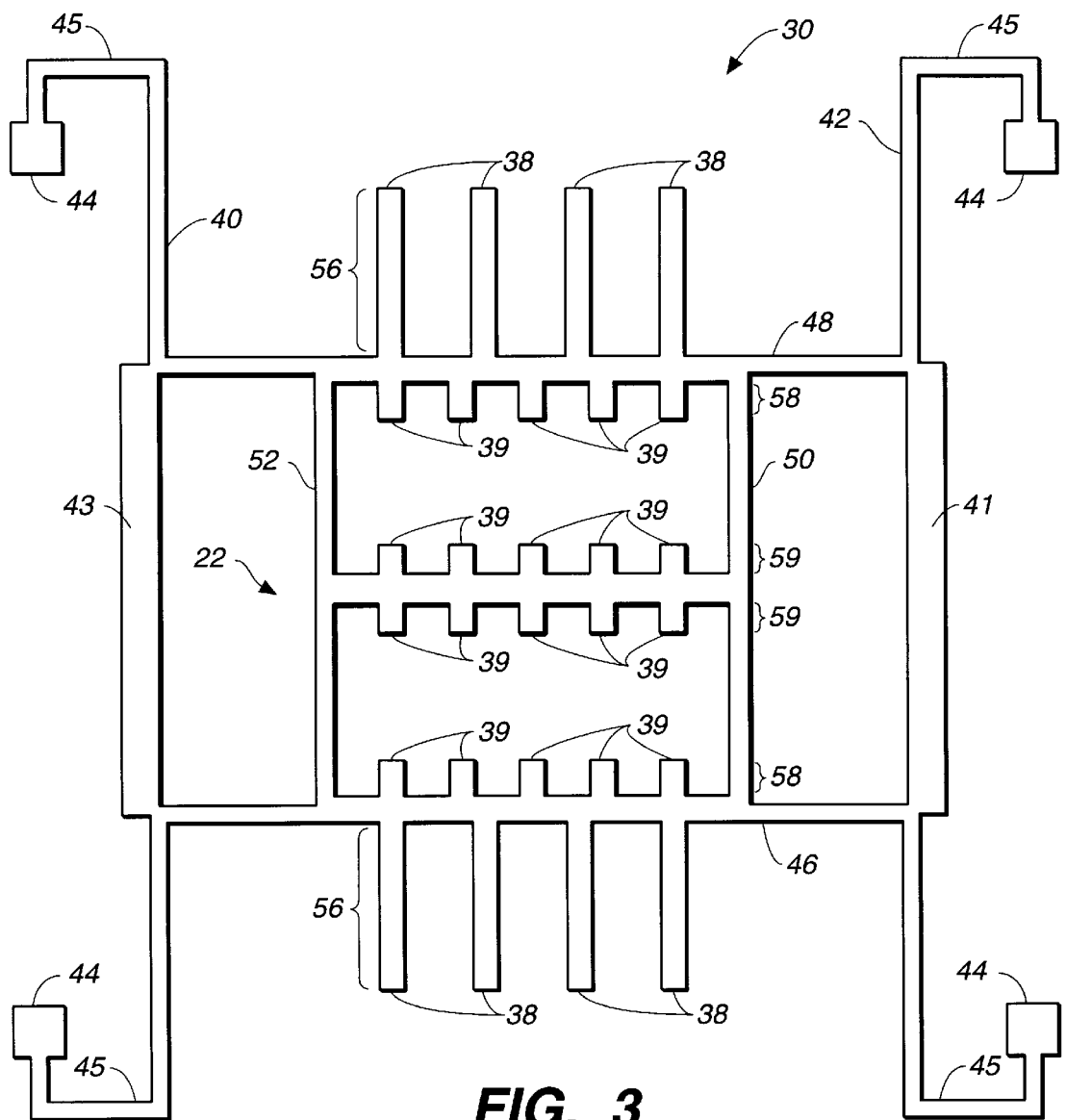
FIG._3

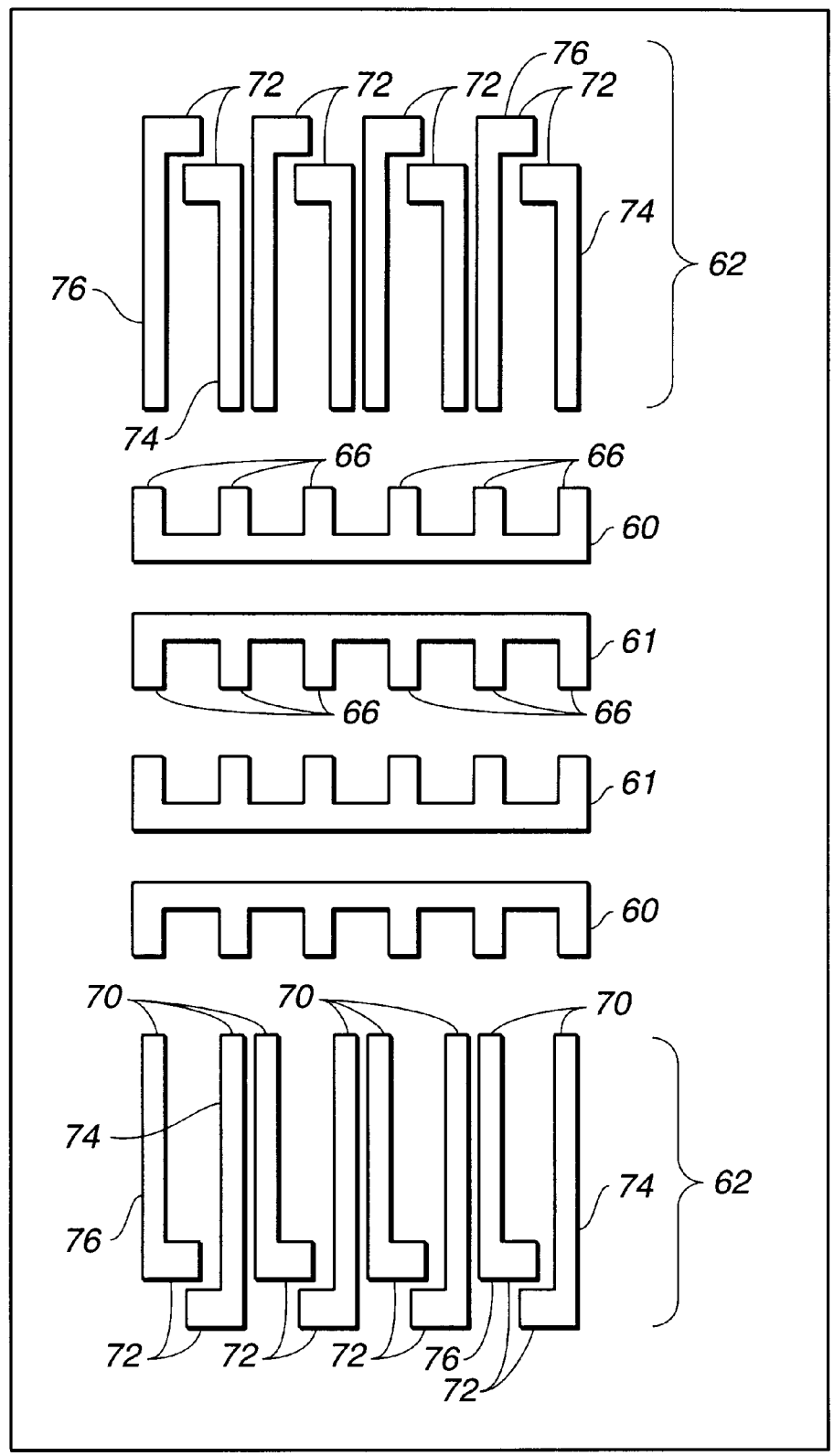
FIG._4

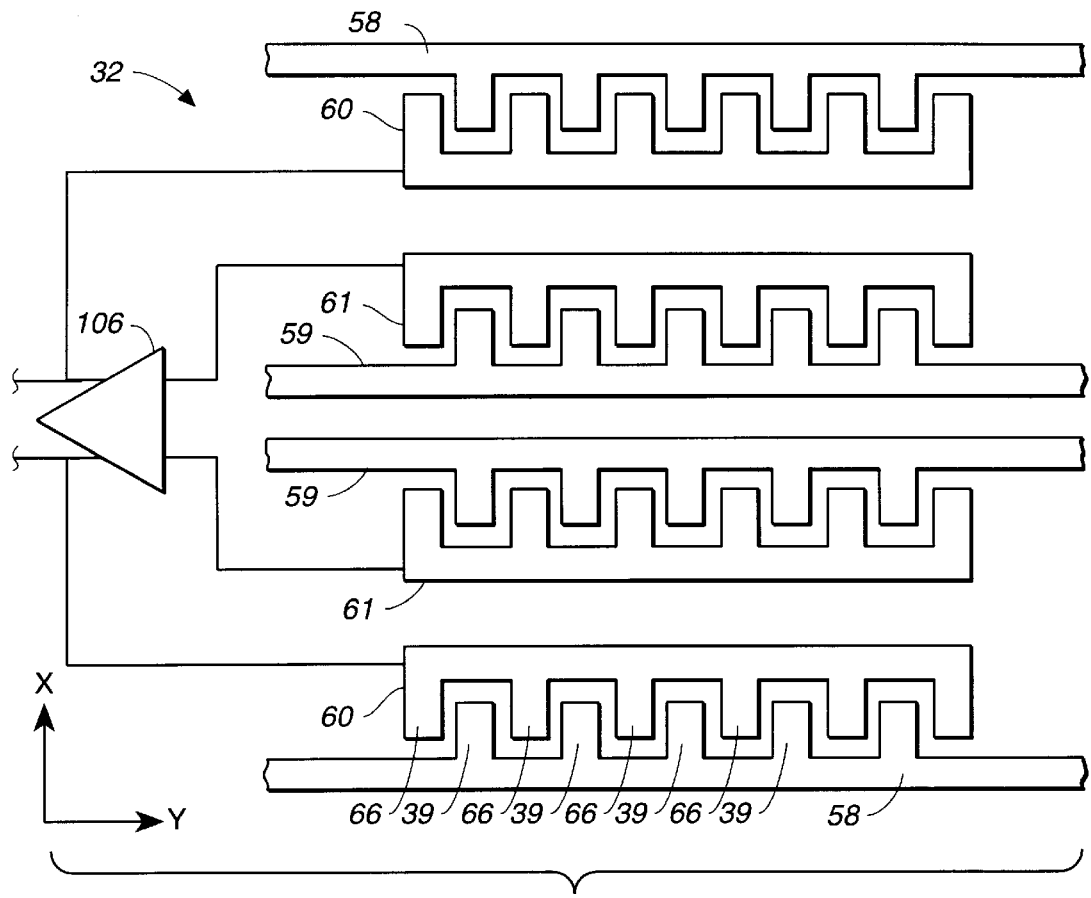
FIG._5
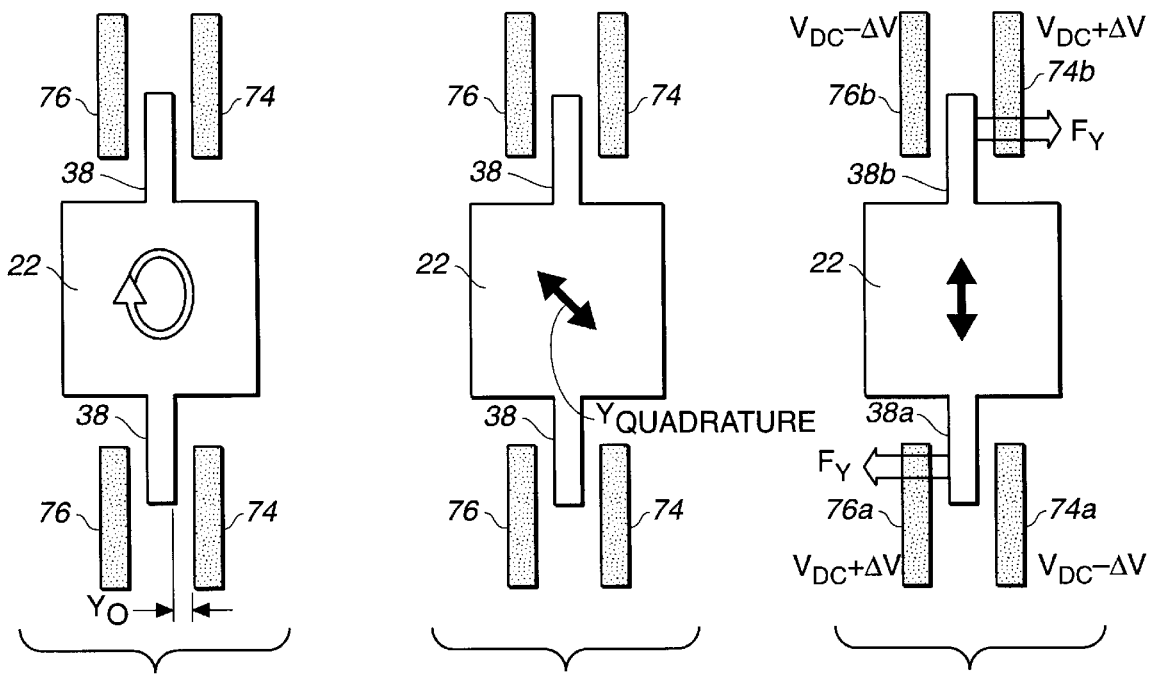
FIG._7A  FIG._7B  FIG._7C

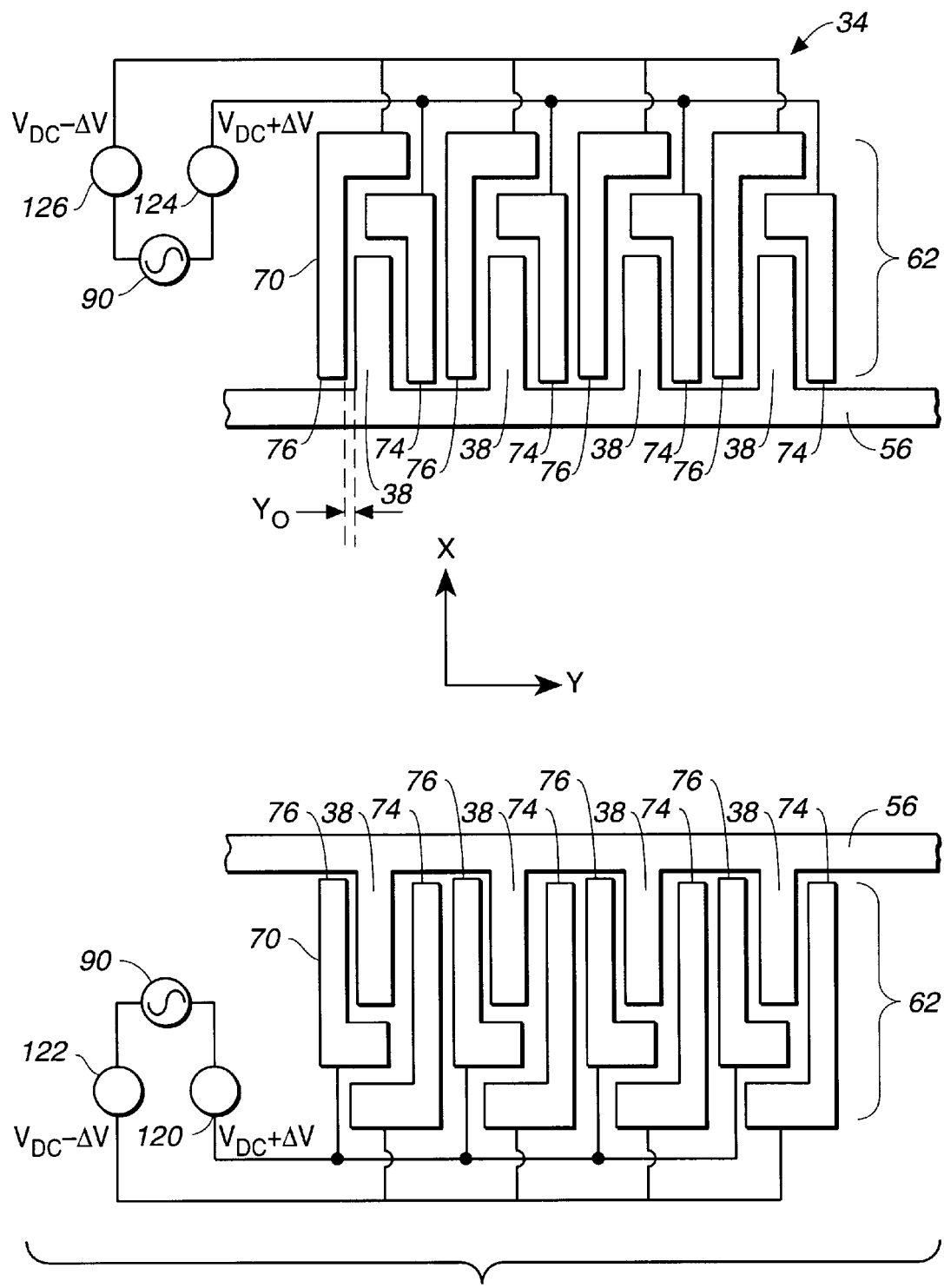
FIG._6

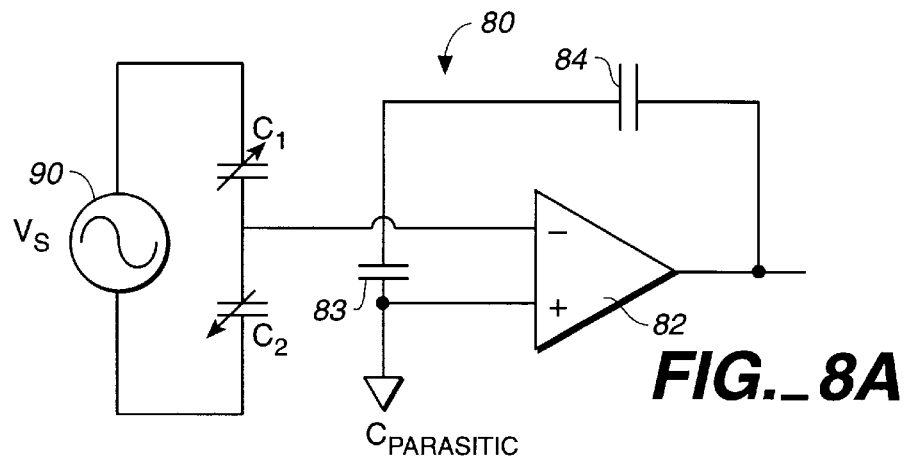
FIG._8A
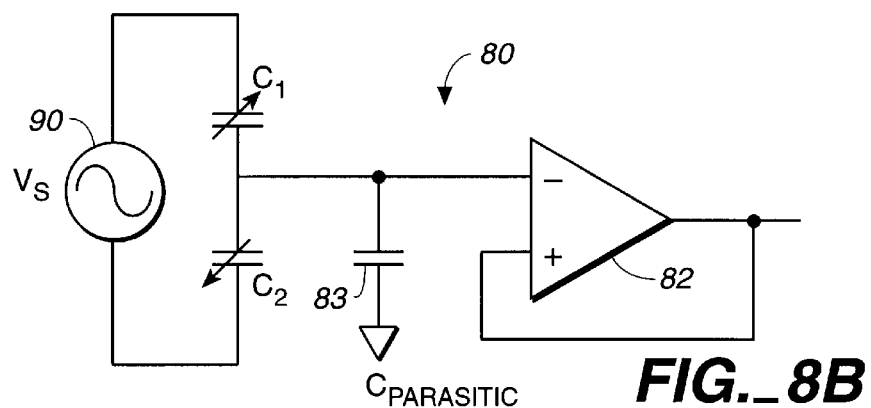
FIG._8B
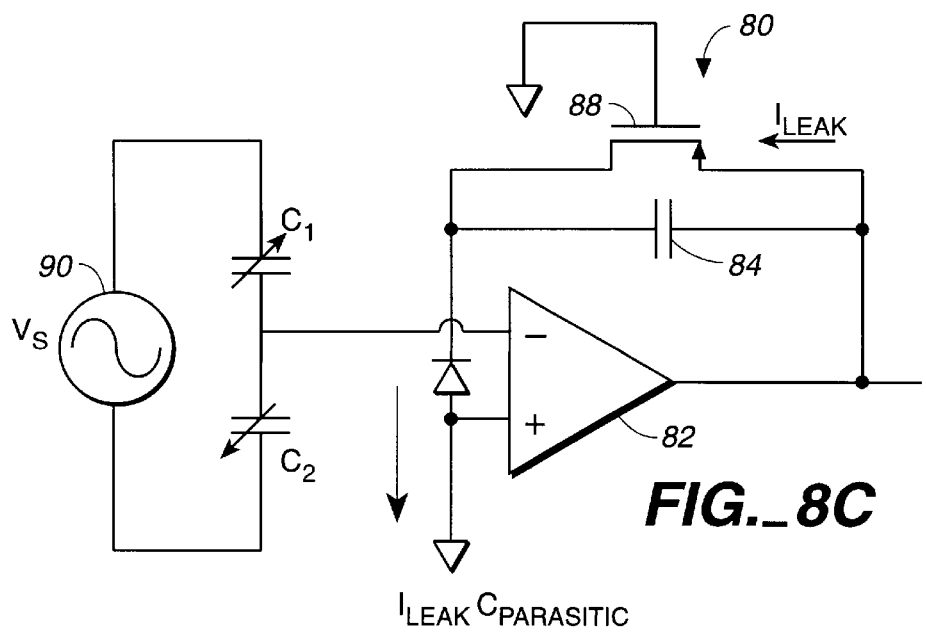
FIG._8C

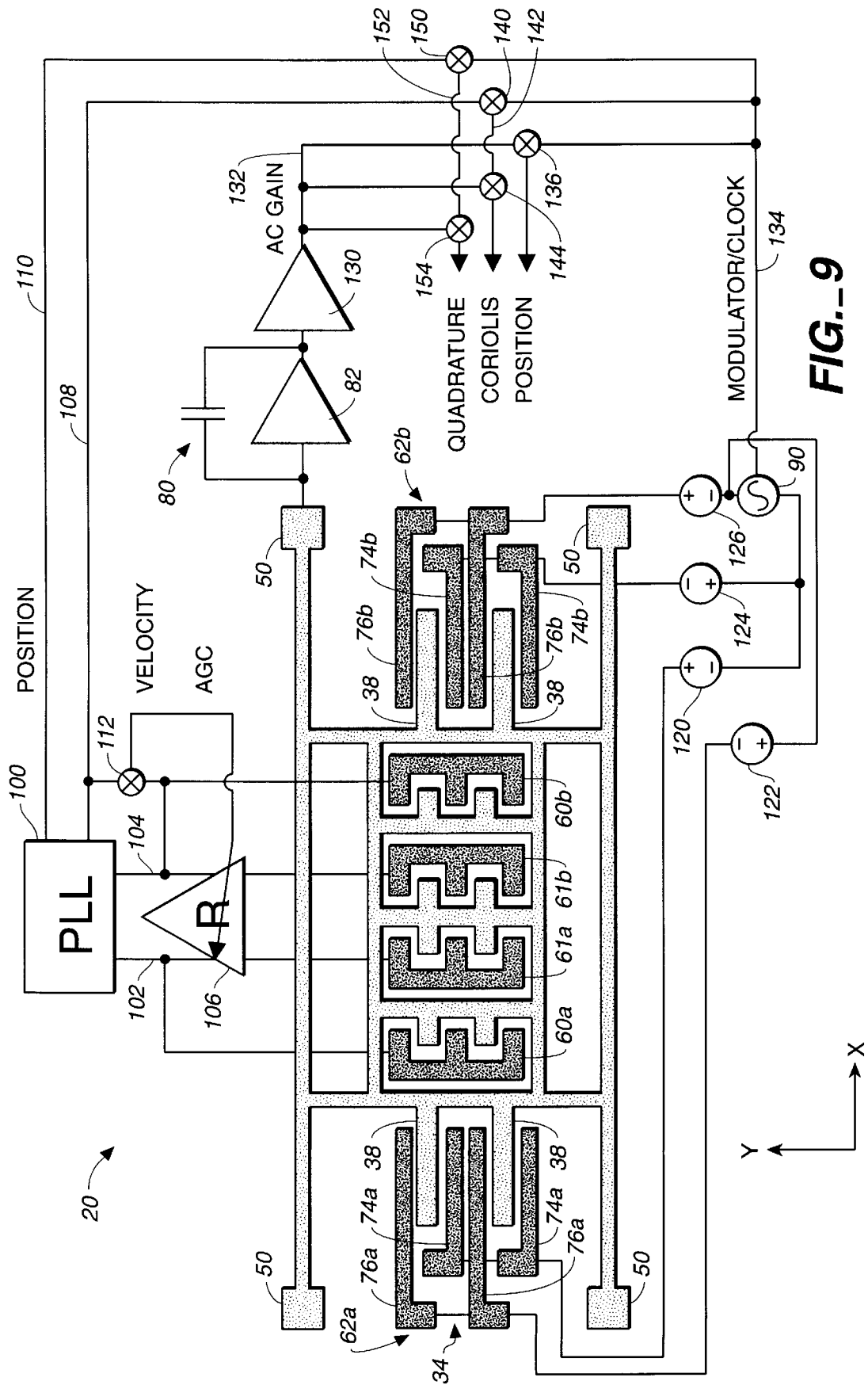
FIG._9

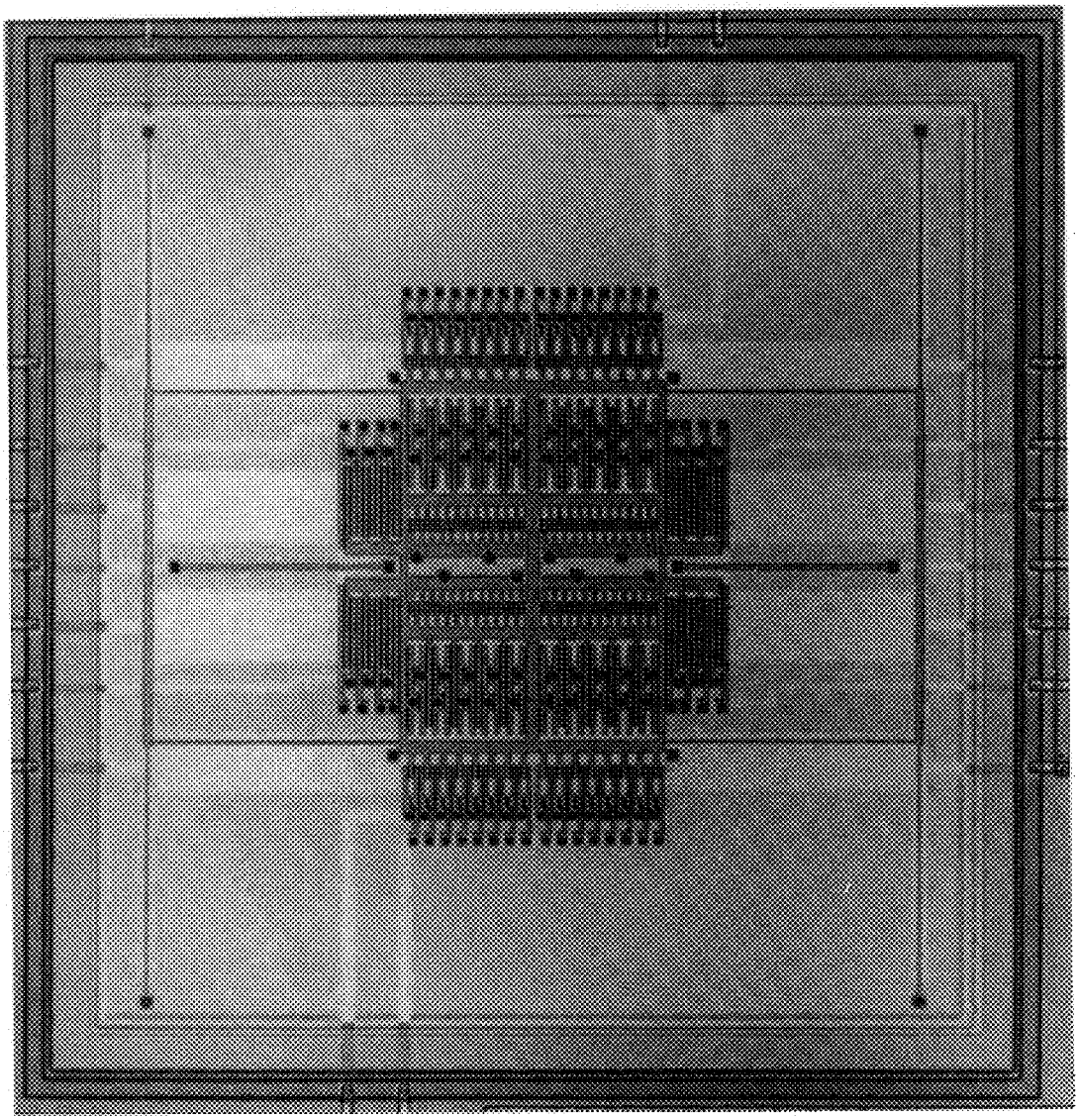
FIG._10

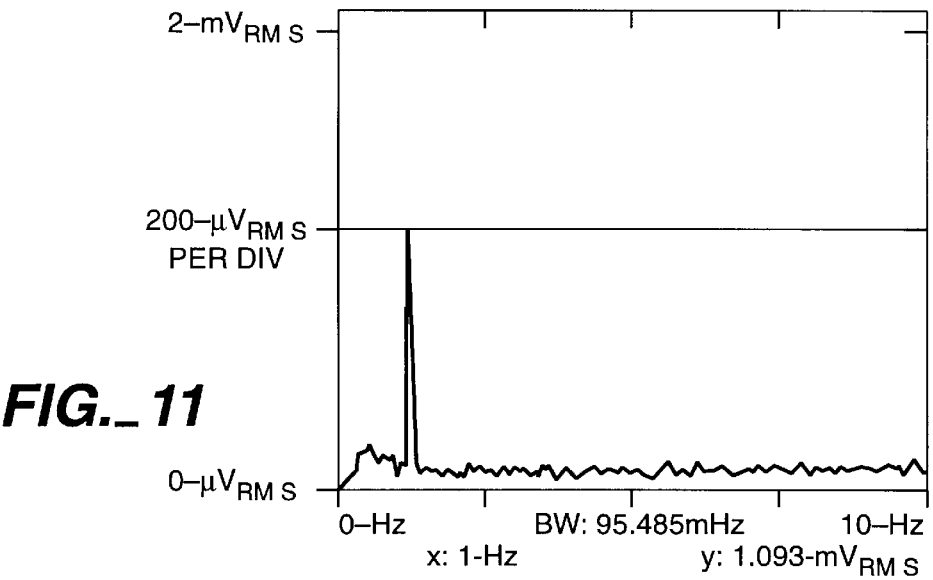
FIG._11
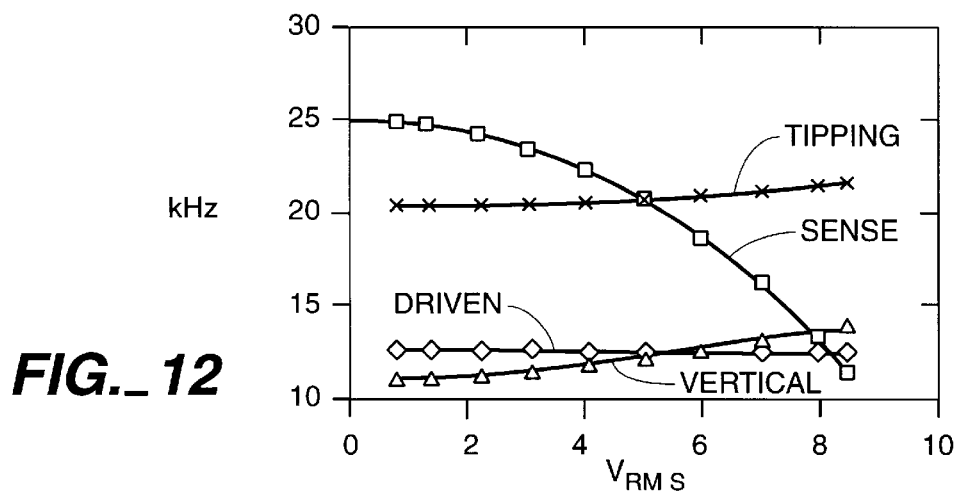
FIG._12
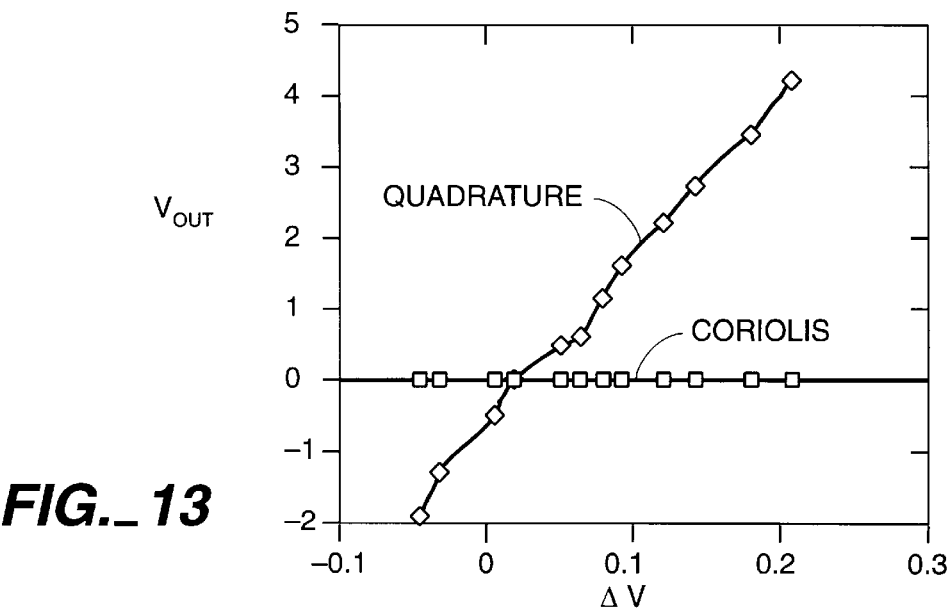
FIG._13

MICROMACHINED Z-AXIS VIBRATORY RATE GYROSCOPE

STATEMENT OF RIGHTS

This invention was made with United States government support under Grant (contract) Number DABT63-93-C-0065 awarded by the Defense Advanced Research Projects Agency (DARPA). The government has certain rights to this invention.

BACKGROUND OF THE INVENTION

The present invention relates generally to microfabricated sensors, and more particularly to microfabricated sensors for measuring the rotation rate of a device about an axis perpendicular to the plane in which the device is fabricated.

Multi-axis sensors are highly desirable for inertial sensing of motion in three dimensions. Previously, such sensors were constructed of relatively large and expensive electromagnetic devices. More recently, micromechanical sensors have been fabricated using semiconductor processing techniques. Specifically, micromechanical accelerometers and gyroscopes have been formed from silicon wafers by using photolithographic techniques. Such microfabricated sensors hold the promise of large scale production and therefore low cost. One objective in the construction of microfabricated sensors is to increase the sensitivity and improve the signal to noise ratio of the device. Another objective is to simplify the fabrication steps so as to reduce the cost and complexity and to increase the yield in the manufacturing process.

The integration of three gyroscopic sensors to measure the rotation rates about the three separate axes coupled with three accelerometric sensors to measure the acceleration along the three axes on a single chip would provide a monolithic, six degree-of-freedom inertial measurement system capable of measuring all possible translations and orientations of the chip. There has been some difficulty in constructing a vibratory rate gyroscope to measure the rotation about the axis normal to the plane of the silicon chip, i.e., the Z-axis.

SUMMARY OF THE INVENTION

In one aspect, the present invention is directed to a microfabricated structure. The structure comprises a substrate, a mass connected to the substrate by a suspension system to vibrate in a plane parallel to a surface of the substrate, and three pluralities of electrode fingers. The first plurality of electrode fingers projects from the mass along a first axis in the plane. The second and third plurality of electrode fingers, electrically isolated from each other, are coplanar with the first plurality of electrode fingers, are connected to the substrate and project substantially along the first axis. The first, second and third plurality of electrode fingers are interdigitated such that each of the first plurality of electrode fingers is adjacent to one of the second plurality of electrode fingers and one of the third plurality of electrode fingers.

Implementations include the following features. A voltage source may apply a voltage between the second and third plurality of electrode fingers. The structure may further comprise a fourth plurality of electrode fingers, coplanar with the first, second and third plurality of electrode fingers, projecting from the mass along the first axis, and a fifth plurality of electrode fingers connected to the substrate but electrically isolated from the second and third plurality of electrode fingers, the fourth and fifth plurality of electrode fingers being interdigitated. Each of the first plurality of electrode fingers may be longer than each of the fourth plurality of electrode fingers.

In another aspect, the invention is directed to a microfabricated structure. The structure comprises a substrate and a suspension system to permit a mass to vibrate in a plane parallel to a surface of the substrate. The suspension system includes first and second substantially parallel beams, each of the first and second beams anchored at both ends to the substrate, and third and fourth substantially parallel beams, one end of each of the third and fourth beams connected to the first beam and another end connected to the second beam.

Implementations include the following features. The structure may include a plurality of fingers projecting along an axis substantially parallel to the first and second beams. The structure may comprise a fifth and a sixth beam one end of each of the fifth beam and sixth beams connected to the third beam and another end connected to the fourth beam, and a seventh beam, one end of the seventh beam connected to the fifth beam and another end connected to the sixth beam. The structure may further comprise a plurality of fingers projecting from the seventh beam along an axis substantially parallel to the first and second beams. Sections of the first and second beams located between the third and fourth beams may be substantially rigid to prevent rotation of the mass.

In another aspect, the invention is directed to a sensor. The sensor comprises a substrate, a mass connected to the substrate by a suspension system to vibrate in a plane parallel to a surface of the substrate, and three pluralities of electrode fingers. The first plurality of electrode fingers projects from the mass along a first axis in the plane. The second and third plurality of electrode fingers, are connected to the substrate and project substantially along the first axis. The first, second and third plurality of electrode fingers are interdigitated such that each of the first plurality of electrode fingers is adjacent to one of the second plurality of electrode fingers and one of the third plurality of electrode fingers. A voltage source applies a first DC voltage between the second and third plurality of electrode fingers to cause the mass to vibrate, absent a Coriolis force, more precisely along the first axis.

Implementations may include the following features. A set of electrode fingers may be positioned opposing the three pluralities of electrode fingers, and a second voltage source for may apply a second DC voltage between a fifth and sixth plurality of electrode fingers to cause the mass to vibrate, absent a Coriolis force, more precisely along the first axis. The second DC voltage may be substantially equal in magnitude but opposite in sign to the first DC voltage. The first plurality of electrode fingers may be electrically coupled to the second plurality of electrode fingers. The sensor may include a voltage source for applying a third DC voltage between the first and third pluralities of electrode fingers and the second, third, fifth and sixth pluralities of electrode fingers to adjust the resonant frequency of vibrations of the mass along a second axis in the plane perpendicular to the first axis.

In another aspect, the invention is directed to a sensor. The sensor comprises a substrate, a mass connected to the substrate by a suspension system to vibrate in a plane parallel to a surface of the substrate, and three pluralities of electrode fingers. The first plurality of electrode fingers projects from the mass along a first axis in the plane. The second and third plurality of electrode fingers, are connected to the substrate and project substantially along the first axis. The first, second and third plurality of electrode fingers are interdigitated such that each of the first plurality of electrode fingers is adjacent to one of the second plurality of electrode fingers and one of the third plurality of electrode fingers. A voltage source applies a DC voltage between the first plurality of electrode fingers and the second and third plurality of electrode fingers to adjust the resonant frequency of vibrations of the mass along a second axis in the plane perpendicular to the first axis.

In another aspect, the invention is directed to a gyroscope for sensing rotation about a Z-axis. The gyroscope comprises a substrate, a mass connected to the substrate by a suspension system to vibrate in a plane parallel to a surface of the substrate, a drive system to cause the mass to vibrate substantially along a first axis in the plane, and three pluralities of electrode fingers. The first plurality of electrode fingers projects from the mass along a first axis in the plane. The second and third plurality of electrode fingers, are connected to the substrate and project substantially along the first axis. The first, second and third plurality of electrode fingers are interdigitated such that each of the first plurality of electrode fingers is adjacent to one of the second plurality of electrode fingers and one of the third plurality of electrode fingers. A position sensor is coupled to the first plurality of electrode fingers for measuring the deflection of the mass along a second axis in the plane perpendicular to the first axis. Rotation of the mass about a Z-axis perpendicular to the surface and vibration of the mass along the first axis generates a coriolis force to deflect the mass along the second axis. A signal processor is coupled to an output of the position sensor to generate a signal varying with the rate of rotation of the mass about the Z-axis.

Implementations include the following features. A voltage source may apply an AC voltage-having a first frequency between the second and third plurality of electrode fingers. A voltage may be applied between the second and third pluralities of electrode fingers to form a capacitive bridge with the first plurality of electrodes, and the position sensor may be coupled to the first plurality of electrodes to detect changes in capacitance when the mass is deflected along the second axis. The sensor may includes an integrator to integrate a signal from the first plurality of electrode fingers. The drive system may generate a signal to cause the mass to oscillate along the first axis at a second frequency. The drive system may include a phase-locked loop to prevent phase-shifting of the signal. The sensor may include a first mixer to mix the signal from the drive system with a signal from the voltage source. The sensor may include a second mixer to mix a signal from the first mixer with an output signal from the position sensor to produce a position quadrature signal or coriolis signal. The sensor may include a mixer to mix an output signal from the position sensor with a signal from the voltage source to produce a position signal.

Objects and advantages of the invention will be set forth in the description which follows, and in part will be obvious from the description, or may be learned by practice of the invention. The objects and advantages of the invention may be realized by means of the instrumentalities and combinations particularly pointed out in the claims.

BRIEF DESCRIPTION OF THE DRAWING

The accompanying drawings, which are incorporated in and constitute a part of the specification, schematically illustrate the present invention, and together with the general description given above and the detailed description given below, serve to explain the principles of the invention.

FIG. 1 is a schematic illustration of a spring-mass system which is equivalent to an electrostatic gyroscope.

FIG. 2 is a schematic perspective view of a microfabricated gyroscopic sensor according to the present invention.

FIG. 3 is a schematic top view of the movable elements of the gyroscopic sensor of FIG. 2.

FIG. 4 is a schematic top view of the fixed elements of the gyroscopic sensor of FIG. 2.

FIG. 5 is a schematic top view of the drive system of the gyroscopic sensor of FIG. 2.

FIG. 6 is a schematic top view of the sensing system of the gyroscopic sensor of FIG. 2.

FIGS. 7A–7C are schematic illustrations of the motion of the proof mass under the influence of the Coriolis acceleration and quadrature error.

FIG. 8A is a schematic circuit diagram of an integrator used to measure the position of the proof mass in the gyroscopic sensor of FIG. 2.

FIG. 8B is a schematic circuit diagram in which the integrator of FIG. 8A is replaced by a voltage buffer.

FIG. 8C is a schematic circuit diagram in which the integrator of FIG. 8A uses a subthreshold MOSFET.

FIG. 9 is a schematic illustration of the signal processing circuitry of a gyroscopic sensor according to the present invention.

FIG. 10 is a photograph of a fabricated gyroscopic sensor.

FIG. 11 is a graph illustrating the response of the gyroscopic sensor to rotation about the Z-axis.

FIG. 12 is a graph illustrating the response of the Y-axis resonant frequency to an applied bias voltage.

FIG. 13 is a graph illustrating the response of the quadrature error to an applied voltage differential.

DESCRIPTION OF THE PREFERRED EMBODIMENTS

Referring to FIG. 1, a Z-axis vibratory rate gyroscope functions by generating and sensing Coriolis acceleration. The functional operation of the Z-axis vibratory rate gyroscope of the present invention is illustrated by an equivalent spring-mass system. In vibratory rate gyroscope 10, a proof mass 12 is supported by a flexible suspension 14 from a rigid frame 16. Proof mass 12 is oscillated along the X-axis (the drive mode) by a drive force FD as the frame rotates about the Z-axis. The combination of rotation and oscillation generates a Coriolis force $F_c$ along the Y-axis on the oscillating proof mass. The Coriolis acceleration is detected as a deflection of the proof mass along the Y-axis (the sense mode).

Referring to FIG. 2, a micromachined gyroscopic sensor 20 designed according to the present invention includes a microelectromechanical sense element or proof mass 22 connected to a rigid frame or substrate 24. The gyroscopic sensor 20 measures the Z-axis vibratory rate, i.e., the rotation of the substrate about the axis normal to the micromachined surface 26 of substrate 24. The micromachined gyroscopic sensor 20 includes three major elements: a suspension system 30, a drive system 32 used to sustain oscillation of proof mass 22 along the X-axis, and a sensing system 34 used both to detect deflections of proof masks 22 along the Y-axis and to apply electrostatic forces to cancel any quadrature error, as will be described in detail below.

Referring to FIG. 3, suspension system 30 may be formed integrally with proof mass 22. Suspension system 30 supports the proof mass so that it may vibrate in a plane parallel to surface 26. Suspension system 30 holds proof mass 22 about two microns above the surface of the substrate. The total mass of proof mass 22 may be about 0.1 to 0.3 micrograms. Suspension system 30 is generally H-shaped, with two parallel beams 40 and 42 positioned generally along the X-axis. Each beam may be about 500 to 1000 microns in length, preferably about 800 microns. The end of each beam is connected to an anchor 44 which connects the suspension system to the substrate (see FIG. 2). The end of each beam 40, as shown in FIG. 2, may include a folded or J-shaped flexure 45 (see FIG. 3). Alternately, beams 40 and 42 may be linear.

Two beams or crossbars 46 and 48 connect beam 40 to beam 42. Crossbars 46 and 48 are about eight-hundred microns long, and are positioned to trisect beams 40 and 42. Two cross-beams 50 and 52 connect crossbar 46 to crossbar 48. A third beam or crossbar 54 may connect the center of cross-beam 50 to the center of cross-beam 52. The flexible elements of suspension system 30 are constructed of polysilicon and typically have a width and a thickness on the order of two microns. The anchors may be about eight microns square.

The suspension system 30 is designed to be flexible along the X-axis and Y-axis and as rigid as possible to other modes of vibration. In particular, the suspension system must be rigid to rotation about the Z-axis. Small rotations may degrade the performance of the gyroscopic sensor. Large deflections may result in the movable electrode fingers crashing into the stationary electrode fingers. The suspension system provides the necessary translational compliance while maintaining rotational rigidity by thickening the portions of beams 40 and 42 located between crossbars 46 and 48 to form trusses 41 and 43. Trusses 41 and 43 may have a width three to four times the width of the remainder of the beams, i.e., about six to eight microns. The portions of crossbars 46, 48 and 54 from which fingers project may have a width of approximately four microns.

The proof mass 22 also includes a plurality of finger electrodes (or simply fingers) which are used to drive and sense oscillations of proof mass along the X-axis and Y axis. A plurality of long fingers 38 project outwardly along the X-axis from crossbars 46 and 48, and a plurality of short fingers or stubs 39 project inwardly along the X-axis from crossbars 46, 48 and 54. The crossbars 46 and 48 form the spines and long fingers 38 form the prongs of two movable sensing electrodes 56. Similarly, crossbars 46, 48 and 54 form the spines and short fingers 39 form the prongs of two movable driving electrodes 58 and two movable feedback electrodes 59. The short fingers 39 may be about ten to twenty-five microns in length, preferably fifteen microns in length, whereas the long fingers 38 may be about one-hundred to two-hundred microns in length, preferably one-hundred and fifty microns in length.

Referring to FIG. 4, one or more stationary driving electrodes 60, one or more stationary feedback electrodes 61 and one or more stationary sensing electrodes 62 may be rigidly connected to substrate 24. Preferably, two stationary driving electrodes 60 are arranged relative to each other in an opposing configuration. Similarly, two stationary feedback electrodes 61 face each other in an opposing configuration. Each stationary driving electrode 60 and each stationary feedback electrode 61 includes a plurality of short fingers 66. Stationary driving and feedback electrodes 60 and 61 preferably have a few to dozens of fingers. Short fingers 66 may have a length of approximately 15 microns and a width of approximately three to six microns, preferably four microns.

Stationary sensing electrode 62 includes a plurality of long fingers 70. Each long finger 70 protrudes from a base 72. The fingers of stationary sensing electrode 62 are arranged in pairs, each pair including a right finger 74 and a left finger 76. Each long finger 70 may be approximately one hundred and fifty microns in length, and have a width of approximately four microns.

Referring to FIG. 5, drive system 32 includes movable and stationary driving electrodes 58 and 60, and movable and stationary feedback electrodes 59 and 61. One set of short fingers 39 is interdigitated with short fingers 66 of stationary driving electrode 60. Another set of short fingers 39 is interdigitated with short fingers 66 of stationary feedback electrodes 61. Short fingers 39 of moveable electrodes 58 and 59 and short fingers stationary 66 of electrodes 60 and 61 may be formed from the same layer of polysilicon prior to the removal of the sacrificial layer so that the fingers may be co-planar.

The driving electrodes of drive system 32 act as electrical-mechanical transducers. By application of an alternating voltage between the stationary driving electrodes 60 and the movable driving electrodes 58, proof mass 22 may be forced to oscillate or reciprocate along the X-axis. The motion along the X-axis induces bending in crossbars 46 and 48 so that proof mass 22 may move toward and away from stationary driving electrode 60. A more detailed explanation of the manner of operating drive system 32 in order to sustain oscillations in proof mass 22 may be found in U.S. Pat. No. 5,025,346, issued Jun. 18, 1991 to Tang et al., entitled Laterally driven Resonant Microstructures, and assigned to the assignee of the present invention, the entirety of which is incorporated herein by reference; and in U.S. Pat. No. 5,491,608, issued Feb. 13, 1996 to Nguyen, and entitled Q-Controlled Microresonators and Tunable Electronic Filters Using Such Resonators, and assigned to the assignee of the present invention, the entirety of which is incorporated herein by reference.

Referring to FIG. 6, sensing system 34 includes a stationary sensing electrode 62 and movable sensing electrode 56. The long fingers 38 of moving sensing electrode 56 and fingers 70 of stationary sensing electrode 62 are interdigitated, with each long finger 38 disposed between a right finger 74 and a left finger 76 of sensing electrode 62. The spacing, $Y_o$, between fingers 70 and fingers 38 may be approximately one micron. Fingers 38 and 70 may be formed from the same layer of polysilicon so that the fingers are co-planar. Thus all of the driving and sensing elements may be formed in the same fabrication step. In addition, driving mode and the sensing mode operate in the X-Y plane parallel to the surface of substrate 24. As will be described in more detail below, sensing system 34 is used to sense the deflection of proof mass 22 along the Y-axis, to apply electrostatic forces to balance and eliminate the effect of quadrature error, and to tune the resonant frequency of Y-axis vibrations of the proof mass.

As discussed above, the drive system 32 causes proof mass 22 to oscillate along the X-axis. The position of the proof mass along the X-axis is given by the following equation:

$$x(t) = X_0 \sin \omega_x t \qquad (1)$$

where $X_0$ is the amplitude of the oscillation and $\omega_x$ is the frequency of the driving voltage (and thus the oscillation frequency). The frequency of the driving voltage, $\omega_x$, may be between 7 kHz and 100 kHz, and the driving voltage may be sufficient to cause the proof mass to undergo a maximum deflection, $X_0$, of about one micron. The magnitude of the Coriolis acceleration, $\ddot{y}_{Coriolis}$, is given by the following equation:

$$\ddot{y}_{Coriolis} = 2 \cdot \Omega_z(t) \times \dot{x}(t) \quad (2)$$

where $\Omega_z(t)$ is the rate of rotation of the proof mass about the Z-axis and $\dot{x}$ is the velocity of the proof mass along the X-axis. Equations 1 and 2 may be combined as follows:

$$\ddot{y}_{Coriolis} = 2 \cdot \Omega_z(t) \cdot X_0 \cdot \omega_x \cdot \cos\omega_x t \quad (3)$$

For a gyroscopic sensor with an oscillation amplitude, $X_0=1$ μm, oscillation frequency, $\omega_x=20$ kHz, and an input rotation rate, $\Omega_z=1$ deg/sec, the Coriolis acceleration has a magnitude of 0.45 milliG's.

The Coriolis acceleration is an amplitude-modulated signal in which the carrier frequency is the oscillation frequency and the rotation rate modulates the amplitude. The resulting Coriolis acceleration is a dual sideband signal centered on the oscillation frequency. Referring to FIG. 7A, since the Y-axis accelerations are proportional to velocity, the motion of proof mass 22 is elliptical. The maximum deflection of proof mass 22 along the Y-axis will be a few nanometers. The deflection detectable by gyroscopic sensor 20 is approximately one to ten picometers.

In an ideal device, the moving electrodes are perfectly aligned with the stationary electrodes so that the only motion caused by drive system 32 is along the X-axis. However, one effect of manufacturing flaws is quadrature error. Referring to FIG. 7B, quadrature error occurs if proof mass 22 oscillates along an axis that is not exactly parallel to the X-axis. If this is the case, then there is some small fraction, $\epsilon$, of the drive oscillation, $X(t)$, which lies along the Y-axis. This quadrature displacement along the Y-axis is given by the following equation:

$$y_{Quadrature} = -\epsilon \cdot x(t) \quad (4)$$

If we differentiate this displacement twice, we arrive at the acceleration, $\ddot{y}_{quadrature}$, due to off-axis oscillation. This acceleration, given in Equation 5 below, is referred to as quadrature error.

$$\ddot{Y}_{Quadrature} = \epsilon \cdot X_0 \cdot \omega_x^2 \cdot \sin\omega_x t \quad (5)$$

Note the similarity between the quadrature error and the Coriolis acceleration: both are sinusoidal signals centered at the frequency of oscillation. However, the signals can be distinguished by their phase relative to the driven oscillation. Specifically, the Coriolis acceleration is ninety degrees out of phase relative to the drive oscillation, $\omega_x$, whereas the quadrature error is in phase with the driven oscillation.

The quadrature error can be quite large. In fact, the quadrature error may easily exceed the Coriolis acceleration. The ratio of quadrature error and Coriolis acceleration is given by Equation 6:

$$\frac{\ddot{y}_{Coriolis}}{\ddot{y}_{Quadrature}} = \frac{2\Omega_z(t) \cdot X_0 \cdot \omega_x}{\varepsilon \cdot X_0 \cdot \omega_x^2} = \frac{2\Omega_z(t)}{\varepsilon \cdot \omega_x} \quad (6)$$

Using the previous example of an input rotation rate, $\Omega_z$, of 1 deg/sec and an oscillation frequency, $\omega_x$, of 20 kHz, for the quadrature error to be as small as the Coriolis acceleration, the oscillation direction must be accurate to a factor of 1 part in 3.6 million. Due to manufacturing flaws and other imbalances, the quadrature error may be considerably larger than this. Accordingly, gyroscopic sensor 20 has a mechanism to reduce, or nullify the quadrature error.

Microfabricated gyroscopic sensor 20 may apply electrostatic forces to proof mass 22 through sensing system 34. By selection of the proper electrostatic force, the quadrature error may be nullified. As shown by Equation 5, the quadrature error is directly proportional to position of the proof mass along the X-axis. To cancel this error signal without effecting the Coriolis signal, a balancing force must be applied that is also directly proportional to the position of the proof mass along the X-axis. Gyroscopic sensor 20 applies such a balancing force, using the interdigitated Y-axis position sense fingers.

Referring to FIG. 7C, proof mass 22 is shown with two fingers 38a and 38b projecting from opposite sides of the proof mass. Finger 38a is surrounded by right and left fingers 74a and 76a, whereas finger 38b is surrounded by right and left fingers 74a and 76b. A small voltage differential, $2\Delta V$, is applied between the right finger 74 and left finger 76a of each pair of fingers of stationary sensing electrode 62. The opposite voltage potential $2\Delta V$, may be applied between right finger 74b and left finger 76b. This voltage difference creates a balancing force, $F_y$, which counteracts the quadrature error. The balancing force creates a torque which rotates proof mass 22 so that, absent the Coriolis force, fingers 39 vibrate solely along the X-axis. As mentioned above, the balancing force needs to be exactly proportional to the position of the proof mass along the X-axis. An electrostatic force between two charged surfaces is proportional to the overlapping area of the surfaces. Because the overlapping area between fingers 38 and fingers 70 is directly proportional to the position of proof mass 22 along the X-axis, as proof mass oscillates, the position sense capacitors change proportionately. Therefore, the electrostatic balancing force $F_y$ will also be proportional to the position of proof mass 22. Sensing system 34 applies a DC bias voltage $V_{DC}$ to fingers 74 and 76 and voltage differential $\Delta V$ between fingers 74 and 76 given by Equation 7 below:

$$F_y = \frac{C_{overlap}}{y_0} x(t) \cdot ((V_{DC} + \Delta V)^2 - (V_{DC} - \Delta V)^2) = 2\frac{C_{overlap}}{y_0} V_{DC} \Delta V \cdot x(t) \quad (7)$$

where $C_{overlap}$ is the maximum change in capacitance between fingers 70 and fingers 38 as the structure oscillates and $y_0$ is the equilibrium distance between fingers 70 and fingers 38.

By properly selecting the voltage differential $\Delta V$, the quadrature error may be significantly reduced, e.g., by a factor ten to one-hundred. The proper voltage difference may be calculated from Equations (7) and (5) and Newton's law $F=ma$, as follows:

$$\Delta V = M\varepsilon y_0 \frac{\omega_x^2}{V_{DC} C_{overlap}} \quad (8)$$

where M is the mass of proof mass 22. Because the quadrature error is a result of manufacturing defects, the proper voltage differential depends upon the specific structure and may vary from device to device. A voltage differential in the range of 1 mV to 100 mV should be appropriate. The optimum voltage differential to cancel the quadrature error may be determined experimentally (see FIG. 13).

In addition to cancelling the quadrature error, sensing system 34 of gyroscopic sensor 20 may be used to match the Y-axis resonant frequency $\omega_x$ of proof mass 22 to the driving oscillating frequency $\omega_x$. Because gyroscopic sensor 20 is a high Q second order system, the response of proof mass 22 to Coriolis acceleration can be enhanced. As shown by Equation 3, the Coriolis acceleration is a signal centered around the oscillation frequency $\omega_x$. Therefore the relative values of the oscillation frequency $\omega_x$ and the Y-axis resonant frequency $\omega_y$ have a dramatic effect on the response of the sense mode and hence the sensor sensitivity. If the Y-axis resonant frequency is matched to the oscillation frequency, the device may experience a gain of Q in the system response. However, the bandwidth of the sensor is then limited to $\omega_y/Q$. Given that system is run in a vacuum and Q is typically greater than 10,000, the system bandwidth for $\omega_x = \omega_y$ will be only a few Hertz.

For larger bandwidth and increased sensitivity, gyroscopic sensor 20 is operated with a slight mismatch between resonant frequency $w_y$ and oscillation frequency $\omega_x$. The system response of Y-axis displacement due to Coriolis acceleration is given by:

$$\frac{y}{\Omega_z} = \frac{2X_0\omega_x \sin\omega_x t}{\omega_y^2 + \frac{j\omega_x\omega_y}{Q} - \omega_x^2} = \frac{X_0\omega_x}{\omega_x \Delta\omega}\sin\omega_x t \quad (9)$$

Provided that there is a means to tune the Y-axis resonant frequency, it is desirable to operate the gyroscopic sensor with a 5–10% frequency mismatch, $\Delta\omega/\omega_x$, yielding a gain of 5–10 in sensitivity. For example, if $\omega_x$ is about 12 kHz, then $\omega_y$ may be set to about 12.5 kHz. Alternately, the frequency mismatch may be reduced to about 1–2%. Reducing the mismatch further might increase the sensitivity but may be difficult to maintain for any length of time because the resonant frequency changes as the temperature of the gyroscopic sensor changes.

Tuning of the Y-axis resonant to improve sensitivity is accomplished using electrostatic "negative" springs, i.e., by applying a DC bias voltage, $V_{DC}$, between proof mass 22 and stationary sensings electrodes 62. When the DC voltage is established between the moving proof mass and the stationary sensing electrode, the resulting attractive force reduces the total spring constant and thus adjusts the resonant frequency.

Using a first-order model for the parallel-plate capacitors, the linearized spring force due to electrostatic forces is given by:

$$F_y = \left[\frac{1}{(y_0-y)^2} - \frac{1}{(y_0+y)^2}\right] y_0 C_s \frac{V_{DC}^2}{2} \quad (10)$$

where y is the deflection of the proof mass along the Y-axis away from its equilibrium position.

The Y-axis resonant frequency, $\omega_y$, is given by the following equation:

$$\omega_y = \sqrt{\frac{k_y + k_e}{M}} \quad (11)$$

where $k_y$ is the purely mechanical spring constant, $k_e$ is the electrostatic spring constant and M is the mass of proof mass 22. The mechanical spring constant $k_y$ is primarily a function of the stiffness of suspension system 30.

The electromagnetic spring constant, $k_e$, is given by the following equation:

$$k_e = -2\frac{C_s}{y_0}V_{DC}^2 \quad (12)$$

in which $C_s$ is the sense capacitance of the gyroscopic sensor and $Y_0$ is the distance between fingers 38 and 70 (see FIG. 7A). $C_s$ depends upon the total number of fingers and the amount of overlapping area, and should be at least 30 fF. By increasing the number of fingers, $C_s$ may be increased to about one picoFarad (pF). As mentioned above, the spacing $Y_0$ between fingers is about one micron. It may be noted that $k_e$ has a negative value, so that as $V_{DC}$ is increased $\omega_y$ is decreased. The system starts with $\omega_y$ larger than $\omega_x$, and the bias voltage $V_{DC}$ is increased, thereby reducing $\omega_y$, until the desired mismatch $\Delta\omega/\omega_y$ is achieved. The correct valve for $V_{DC}$ must be determined experimentally (see FIG. 12), but should be in the range of one to ten volts.

In addition to cancelling the quadrature error and adjusting the Y-axis resonant frequency, sensing system 34 may be used to negate the effects of centrifugal or centripetal force. As the gyroscope sensor rotates about the Z-axis, a centrifugal force will push the proof mass outwardly (assuming the axis of rotation does not pass exactly through the center of mass of the proof mass). A voltage difference, $V_c$, may be applied between the opposing stationary sensing electrodes 62a and 62b. Because the centripetal force varies at a low frequency, compared to the frequencies of the Coriolis force, a high pass filter may be used to remove the effect of the centripetal force from the output. Gyroscopic sensor 20 measures the position of proof mass 22 along the Y-axis by capacitive deflection sensing. The interdigitated fingers of sensing system 34 (shown in FIG. 2) are used to sense deflection of the proof mass along the Y-axis. The fingers are arranged in a capacitor bridge so that any deflection of the proof mass results in measurable changes in the relative size of the capacitors. In a first order model, the capacitance of a parallel-plate capacitor is inversely proportional to the distance between the plates. Referring to FIGS. 6 and 8A, the space between finger 38 of movable sensing electrode 56 and right finger 74 of sensing electrode 62 forms a first capacitor $C_1$, and the space between finger 38 and left finger 76 form a second capacitor $C_2$. As movable sensing electrode 56 is deflected along the Y-axis, $C_1$ and $C_2$ change. For example, if sensing electrode 56 is deflected leftward, the distance between finger 38 and right finger 74 increases, thereby reducing $C_1$, while the distance between finger 38 and left finger 76 decreases, thereby increasing $C_2$. The change in capacitance is detected by a position sensor 80, such as an integrator or voltage buffer, which includes an amplifier 82. Finger 30 is connected to the negative input of amplifier 82. The negative input of amplifier 82 is connected to ground via a parasitic capacitor 83.

Two common amplifier configurations used for capacitive position sensing are shown in FIGS. 8A and 8B. Referring to FIG. 8A, the output of amplifier 82 is connected to the negative input of the amplifier via an integrating capacitor 84 to form an integrator. Referring to FIG. 8B, the output of amplifier 82 is connected to its positive input to form a voltage buffer. The integrator shown in FIG. 8A offers the flexibility of trading bandwidth foro sensitivity by varying the integrating capacitor size. The integrator also provides lower distortion. Some of the parasitic capacitors involved in microelectromechanical systems (MEMS) are nonlinear which will vary the gain of a buffer and thereby result in distortion, and the practice of bootstrapping parasitic capacitance is a form of positive feedback which exacerbates amplifier distortion. However, because the integrator uses a fixed, linear capacitor, distortion is kept to a minimum. The equivalent input referred noise (measured as a deflection of a sense capacitor plate) is the same for both configurations.

Unfortunately, the integrator presents a difficult biasing problem. Ideally, biasing can be performed by placing a very large resistor in parallel with the integrating capacitor. However, any practical implementation of a large resistor results in a considerable parasitic capacitance. A diode can also be used in parallel with the integrating capacitance; however, that adds a nonlinear capacitance to the integrating capacitance resulting in distortion. Referring to FIG. 8C, this biasing problem has been solved by using a subthreshold metal oxide semiconductor field effect transistor (MOSFET) 88. The MOSFET device is connected in parallel with integrating capacitor 84 so that the source of MOSFET 88 is connected to the output of amplifier 82, the drain is connected to the negative input of amplifier 82, and the gate is connected to ground. In the subthreshold regime, the MOSFET device exhibits extremely low transconductance and no source-to-drain capacitance. The use of subthreshold MOSFET device has resulted in a well behaved integrator operable down to 1 kHz with a 50 F integrating capacitor without additional noise or distortion attributable to the bias circuitry.

Because capacitance cannot be measured with a DC voltage, voltage source 90 applies an AC voltage $V_S$ between fingers 74 and 76. The voltage $V_S$ is about 0.1 to 5.0 volts, preferably about one volt, and has a frequency much higher than the driving frequency $\omega_x$. For example, the frequency of voltage source 90 may be about one megahertz.

Referring to FIG. 9, gyroscopic sensor 20 includes a phase-locked loop (PLL) 100 and several synchronous demodulators or mixers to perform signal processing. Phase-locked loop 100 produces extremely accurate digital signals having a driving frequency $\omega_x$ between about 7 kHz and 100 kHz. The drive frequency, $\omega_x$, may be generated by dividing down the signal from voltage source 90. The phase-locked loop ensures that the position signals are exactly in phase with the position of proof mass 22. Phase-locked loop 100 may also generate a velocity signal 108 which is exactly ninety degrees out of phase with a position signal 110. Position signals 102 and 104, having opposite amplitudes, are supplied by phase-locked loop 100 to the positive and negative outputs of a trans-resistance amplifier 106. Opposing stationary drive electrodes 60a and 60b are also connected to the positive and negative outputs of trans-resistance amplifier 106. Opposing stationary feedback electrodes 61a and 61b are connected to the positive and negative inputs of trans-resistance amplifier 106. One of the outputs of trans-resistance amplifier 106 is mixed with velocity signal 108 by a mixer 112. The combined output of mixer 112, is applied to trans-resistance amplifier 106 to provide an automatic gain control (AGC) circuit to control the amplitude of the oscillations of proof mass 22 along the X-axis. The phase accuracy of the phase-locked loop is critical to the operation of gyroscopic sensor 20 because any phase error will result in cross-talk between the Coriolis and quadrature signals. Assuming that a phase error $\theta_n(t)$ is generated by phase noise in the phase-locked loop, the error in the rotation rate $\Omega$ may be derived as shown in Equations 13–15 below:

$$y(t) = \left[\frac{X_0 \omega_x}{\omega_x \Delta \omega} \Omega \cos \omega_x t + Y_{Quadrature} \sin \omega_x t\right] \quad (13)$$

$$\Omega_{est} = \frac{\omega_x \Delta \omega}{X_0 \omega_x} y(t) \cos(\omega_x t + \theta_n(t)) \quad (14)$$

$$\Omega_{est} = \Omega + \frac{\omega_x \Delta \omega}{X_0 \omega_x} Y_{Qadrature} \theta_n(t) + \text{Higher terms} \quad (15)$$

Because phase-locked loop 100 is extremely accurate, phase noise is minimized and variable cross-talk is extremely small.

The nulling of the quadrature error, the tuning of the Y-axis resonant frequency, and the balancing of the centrifugal forces is accomplished by the application of the proper voltages to fingers 70 of opposing stationary sensing electrodes 62a and 62b. Specifically, gyroscopic sensor 20 includes four DC bias voltage sources 120, 122, 124 and 126. Voltage source 120 applies a total voltage $V_t = V_{DC} + \Delta V + V_C$ to right fingers 74a of sensing electrode 62a. Voltage source 122 applies a total voltage of $V_{DC} - \Delta V - V_C$ to left fingers 76a. Voltage source 124 applies a total voltage of $V_{DC} - \Delta V + V_C$ to right fingers 74b of sensing electrode 62b. Voltage source 126 applies a total voltage of $V_{DC} + \Delta V - V_C$ to left fingers 76b. Thus, voltage sources 120, 122, 124 and 126 provide all of the necessary bias voltages in order to nullify the quadrature error, select the desired Y-axis resonant frequency, and cancel any centrifugal forces. Of course, any other combination of voltage sources providing the same effective total voltage to the fingers of the sensing electrodes could be used. Also, the voltages could be applied by different sets of fingers of the stationary sensing electrode, i.e., $V_{DC}$ could be applied by one set of fingers and $\Delta V$ could be applied by another set of fingers.

In order to extract the position, Coriolis effect, and quadrature signals from capacitive position sensor 80, the signal from amplifier 82 is boosted by an oscillation amplifier 130 to produce an output signal 132. The output signal 132 may be mixed with signals from a modulator or clock and the position and velocity signals from phase locked loop 100. Voltage source 90 may produce a high frequency, e.g., one megahertz clock signal 134. To generate the position signal, clock signal 134 is mixed with output signal 132 by a mixer 136. In order to produce the Coriolis signal, clock signal 134 is mixed with velocity signal 108 by a mixer 140 to produce a combined signal 142. The combined signal 142 is then mixed with output signal 132 by a mixer 144 to produce the Coriolis signal. Finally, to produce the quadrature signal, clock signal 134 is mixed with position signal 110 by a mixer 150 to produce a combined signal 152. The combined signal 152 is then mixed with output signal 132 by a mixer 154 to produce the quadrature signal. The position, Coriolis and quadrature signals may be passed through low pass filters to filter out high frequency components.

Referring to FIG. 10, a gyroscopic sensor 20 was fabricated on a silicon substrate 24 using a combination of metal oxide semiconductor and microelectromechanical fabrication techniques. The trans-resistance amplifier and integrator were fabricated on the same die, and the remaining electronics was implemented off of the chip. The mechanical sensing element is about one millimeter across.

There are a number of possible noise sources in gyroscopic sensor 20. Principle among these are: Brownian noise, op-amp noise in the integrator, and phase locked loop phase noise. The Brownian noise, $\Omega_n B$, represents the fundamental limit and is given by:

$$\Omega_{nB} = \sqrt{\frac{kT\omega_y BW}{MQ\omega_x^2 X_0^2}} \qquad (16)$$

where k is Boltzman's constant, T is the temperature, M is the mass of proof mass 22, BW is the bandwidth of the gyroscopic sensor, and Q is the quality factor. As an example, consider a gyroscopic sensor with mass, M=0.2 µg, an oscillation amplitude, $X_0$=1 µm, a quality factor, Q=10,000, a bandwidth, BW=100 Hz, and a resonant frequency 20 kHz. For this example, we find a Brownian noise floor $\Omega_{nB}$=0.06 deg/sec. Because the gyroscopic sensor is run in vacuum and has a high Q, Brownian noise is not the dominant noise source.

As shown by Equation 15, phase noise in the phase locked loop, represented by $\theta_n(t)$, can cause variable cross talk between quadrature and Coriolis signals. In gyroscopic sensor 20, this effect is kept to a minimum due to the low phase noise in the phase locked loop and nulled quadrature error.

The integrator op-amp noise is the dominant noise source in gyroscopic sensor 20. The input-referred noise of the op-amp noise is a function of the total capacitance, $C_T$, attached to the summing node of the integrator, and is given by:

$$\Omega_{nE} = \frac{C_T y_0 v_n}{C_s X_0 V_s} \Delta\omega \sqrt{2BW} = \frac{y_0 \Delta\omega}{X_0 V_s} \sqrt{\frac{32kTBW}{3\pi C_S f_T}} \qquad (17)$$

where $f_T$ is the maximum operable frequency of the transistors in gyroscopic sensor 20. The electronic noise is at best $\Omega_{nE}$=0.08 deg/sec for a modest CMOS process with $f_T$=250 MHz, a frequency mismatch, $\Delta\omega$=1 kHz, a sense voltage, $V_S$=1 volt, a sense capacitance, $C_s$=100 fF, and the oscillation amplitude and finger spacing, $X_0=y_o$=1 µm.

An initial characterization of the gyroscopic sensor response is shown in FIG. 11. FIG. 11 is a graph of the logarithm of the output voltage of the Coriolis signal, on the Y-axis, as a function of frequency, on the X-axis. The graph was produced by measuring the output Coriolis signal in response to a 1 Hz, 5 deg/sec sine wave. The gyroscopic sensor was operated with an oscillation frequency, $\omega_x$, of 12 kHz and a Y-axis resonant frequency, $\omega_y$, of about 12.5 kHz. The noise floor for this version of Z-axis vibratory rate gyroscopic sensor is 1 deg/sec/Hz$^{1/2}$.

Referring to FIG. 12, there is a measured mechanical resonant frequencies of proof mass 22 as a function of the DC bias voltage applied to the position sense fingers. FIG. 12 shows a graph of the resonant frequencies of proof mass 22 (on the Y-axis of the graph) as a function of the RMS voltage (on the X-axis of the graph) applied between fingers 38 and fingers 70. The RMS voltage is a combination of the DC bias voltage and the AC voltage generated by voltage source 90. The resulting electrostatic springs reduce the resonant frequency of the sense modes, raise the resonant frequencies of the out-of-plane modes, and leaves the driven mode unaffected. As expected, the Y-axis resonant frequency drops as the bias voltage is increased and the oscillation frequency of proof mass 22 remains constant at 12 kHz. The resonant frequencies of the vertical and tipping modes increase with DC bias due to electrostatic levitation effects.

As discussed above, gyroscopic sensor 20 includes a means to null quadrature error. FIG. 13 shows a graph of the measured voltage, $V_{out}$ on the Y-axis, as a function of the voltage differential, $\Delta V$, on the X-axis, which is applied between right fingers 74 and left fingers 76. Both the quadrature and rotation rate signals were plotted for a zero rotation rate as $\Delta V$ was adjusted. Measurements of the quadrature error and rotation rate signals demonstrate that the quadrature error signal can be controlled independently of the Coriolis signal.

In summary, microfabricated gyroscopic sensor 20 may be used to measure the rotation about an axis perpendicular to the surface of the substrate. The gyroscopic sensor may be fabricated from polysilicon using conventional techniques, and the driving electrodes, X-axis sensing electrodes, and Y-axis sensing electrodes may all be fabricated from a signal structural layer to simplify the processing steps. The gyroscopic sensor includes movable sensing electrode fingers which are positioned between paired stationary sensing electrode fingers. The position of the proof mass along the Y-axis is measured by a capacitive bridge which depends upon the location of the movable sensing electrode fingers. A voltage differential may be applied between the pairs of stationary electrode fingers to reduce the quadrature error, and a bias voltage may be applied between the movable and stationary electrode fingers to adjust the Y-axis resonant frequency.

The present invention has been described in terms of a preferred embodiment. The invention, however, is not limited to the embodiment depicted and described. Rather, the scope of the invention is defined by the appended claims.

What is claimed is:

1. A sensor comprising:
   a substrate;
   a mass connected to said substrate by a suspension system to vibrate in a plane parallel to a surface of said substrate;
   a first plurality of electrode fingers projecting from said mass along a first axis in said plane;
   a second plurality of electrode fingers connected to said substrate and projecting substantially along said first axis;
   a third plurality of electrode fingers connected to said substrate but electrically isolated from said second plurality of electrode fingers, said third plurality of electrode fingers projecting substantially along said first axis, said second and third pluralities of electrode fingers interdigitated with said first plurality of electrode fingers such that each of said first plurality of electrode fingers is adjacent to one of said second plurality of electrode fingers and one of said third plurality of electrode fingers;
   an electrostatic drive system to apply an oscillatory force to said mass along said first axis to cause said mass to vibrate;
   a position sensor to measure a deflection of said mass in said plane; and
   a first voltage source for applying a first DC voltage between said second and third pluralities of electrode fingers to cause said mass to vibrate, absent a Coriolis force, more precisely along said first axis.

2. The sensor of claim 1 further comprising:
   a fourth plurality of electrode fingers projecting from said mass along said first axis and positioned opposing said first plurality of electrode fingers;
   a fifth plurality of electrode fingers connected to said substrate and projecting substantially along said first axis and positioned opposing said second Plurality of electrode fingers;

a sixth plurality of electrode fingers connected to said substrate but electrically isolated from said fifth plurality of electrode fingers, said sixth plurality of electrode fingers projecting substantially along said first axis and positioned opposing said third plurality of electrode fingers, said fifth and sixth pluralities of electrode fingers interdigitated with said fourth plurality of electrode fingers such that each of said fourth plurality of electrode fingers is adjacent to one of said fifth plurality of electrode fingers and one of said sixth plurality of electrode fingers.

3. The sensor of claim 2 further comprising a second voltage source for applying a second DC voltage between said fifth and sixth plurality of electrode fingers to cause said mass to vibrate, absent a Coriolis force, more precisely along said first axis.

4. The sensor of claim 3 wherein said second DC voltage is substantially equal in magnitude but opposite in sign to said first DC voltage.

5. The sensor of claim 3 wherein said drive system includes a seventh plurality of electrode fingers projecting from said mass along said first axis, an eighth plurality of electrode fingers connected to said substrate and projecting substantially along said first axis and interdigited with said seventh plurality of electrode fingers, and an AC voltage source for applying an AC voltage between said seventh and eighth pluralities of electrode fingers.

6. The sensor of claim 3 further comprising a third voltage source for applying a third DC voltage between said first and fourth pluralities of electrode fingers and said second, third, fifth and sixth pluralities of electrode fingers to adjust a resonant frequency of vibrations of said mass along a second axis in said plane perpendicular to said first axis.

7. The sensor of claim 1 wherein the position sensor measures the deflection of said mass along a second axis substantially perpendicular to said first axis and rotation of said mass about a Z-axis perpendicular to said surface of said substrate and vibration of said mass along said first axis generates a Coriolis force to deflect said mass along said second axis, wherein the sensor further comprises a signal processor coupled to an output of said position sensor to generate a signal varying with the rate of rotation of said mass about the Z-axis.

8. The sensor of claim 7 wherein the position sensor includes an AC voltage source for applying an AC voltage between said second and third pluralities of electrode fingers.

9. The sensor of claim 8 wherein said AC voltage is applied between said second and third pluralities of electrode fingers to form a capacitive bridge with said first plurality of electrode fingers, and said position sensor is coupled to said first plurality of electrode fingers to detect changes in capacitance when said mass is deflected along said second axis.

10. A sensor comprising:
   a substrate;
   a mass connected to said substrate by a suspension system to vibrate in a plane parallel to a surface of said substrate;
   a first plurality of electrode fingers projecting from said mass along a first axis in said plane;
   a second plurality of electrode fingers connected to said substrate and projecting substantially along said first axis;
   a third plurality of electrode fingers connected to said substrate but electrically isolated from said second plurality of electrode fingers, said third plurality of electrode fingers projecting substantially along said first axis, said second and third pluralities of electrode fingers interdigitated with said first plurality of electrode fingers such that each of said first plurality of electrode fingers is adjacent to one of said second plurality of electrode fingers and one of said third plurality of electrode fingers;
   an electrostatic drive system to apply an oscillatory force to said mass along said first axis to cause said mass to vibrate; and
   a voltage source for applying a DC voltage between said first plurality of electrode fingers and said second and third pluralities of electrode fingers to adjust the resonant frequency of vibrations of said mass along a second axis in said plane perpendicular to said first axis.

11. A microfabricated gyroscopic sensor for sensing rotation about a Z-axis, comprising:
   a substrate;
   a mass connected to said substrate by a suspension system to vibrate in a plane parallel to a surface of said substrate;
   a drive system to apply an oscillatory force to said mass along a first axis in said plane to cause said mass to vibrate; p1 a first plurality of electrode fingers projecting from said mass substantially along said first axis;
   a second plurality of electrode fingers connected to said substrate and projecting substantially along said first axis;
   a third plurality of electrode fingers connected to said substrate and projecting substantially along said first axis, said second and third pluralities of electrode fingers interdigitated with said first plurality of electrode fingers such that each of said first plurality of electrode fingers is adjacent to one of said second plurality of electrode fingers and one of said third plurality of electrode fingers;
   a position sensor coupled to said first plurality of electrode fingers for measuring a deflection of said mass along a second axis in said plane perpendicular to said first axis, wherein rotation of said mass about a Z-axis perpendicular to said surface and vibration of said mass along said first axis generates a Coriolis force to deflect said mass along said second axis; and
   a signal processor coupled to an output of said position sensor to generate a signal varying with a rate of rotation of said mass about the Z-axis.

12. The sensor of claim 11 wherein said position sensor includes a voltage source for applying an AC voltage having a first frequency between said second and third pluralities of electrode fingers.

13. The sensor of claim 12 wherein said AC voltage having said first frequency is applied between said second and third pluralities of electrode fingers to form a capacitive bridge with said first plurality of electrodes, and said position sensor is coupled to said first plurality of electrodes to detect changes in capacitance when said mass is deflected along said second axis.

14. The sensor of claim 13 wherein said position sensor further includes an integrator to integrate a signal from said first plurality of electrode fingers.

15. The sensor of claim 14 wherein said drive system generates a signal to cause said mass to vibrate along said first axis at a second frequency.

16. The sensor of claim 15 wherein said drive system includes a phase-locked loop to prevent phase-shifting of said signal.

17. The sensor of claim 15 further including a first mixer to mix the signal from said drive system with a signal from said voltage source.

18. The sensor of claim 17 further including a second mixer to mix a signal from said first mixer with an output signal from said position sensor to produce a position quadrature signal.

19. The sensor of claim 17 further including a second mixer to mix a signal from said first mixer with an output signal from said position sensor to produce a Coriolis signal.

20. The sensor of claim 15 further including a mixer to mix an output signal from said position sensor with a signal from said voltage source to produce a position signal.

21. The sensor of claim 11 further comprising a voltage source for applying a DC voltage between the first plurality of electrode fingers and the second and third pluralities of electrode fingers to adjust a resonant frequency of vibrations of the mass along the second axis.

22. The sensor of claim 11 further comprising a voltage source for applying a first DC voltage between the second and third pluralities of electrode fingers to cause the mass to vibrate, absent a Coriolis force, more precisely along the first axis.

23. A microfabricated gyroscopic sensor, comprising:
a substrate;
a mass connected to the substrate by a suspension system;
a drive system to apply an oscillatory force to the mass along a drive axis substantially parallel to a surface of the substrate to cause the mass to vibrate; and
a position sensor to measure a deflection of the mass along a sense axis substantially parallel to the surface of the substrate, wherein rotation of the mass about an axis of rotation substantially perpendicular to the surface of the substrate and vibration of the mass along the drive axis generates a Coriolis force to deflect the mass along the sense axis.

24. The sensor of claim 23 further comprising a processor coupled to an output of the position sensor to generate a signal varying with the rate of rotation of the mass about the axis of rotation.

25. The sensor of claim 23 wherein the position sensor includes a first sense electrode projecting from the mass, a second sense electrode connected to the substrate and positioned on a first side of the first sense electrode, and a third sense electrode connected to the substrate and positioned on an opposing second side of the first sense electrode.

26. The sensor of claim 25 wherein the position sensor senses a change in capacitance between the first sense electrode, and the second and third sense electrodes.

27. The sensor of claim 25 wherein the first, second and third sense electrodes are substantially coplanar, and each sense electrode has a longitudinal axis substantially aligned with the drive axis.

28. The sensor of claim 23 wherein the drive system includes a first drive electrode projecting from the mass, a second drive electrode connected to the substrate and positioned on a first side of the first drive electrode, and a third drive electrode connected to the substrate and positioned on an opposing second side of the first drive electrode.

29. The sensor of claim 28 wherein the drive system applies an alternating voltage between the between the first drive electrode, and the second and third drive electrodes.

30. The sensor of claim 28 wherein the first, second and third drive electrodes are substantially coplanar, and each drive electrode has a longitudinal axis substantially aligned with the drive axis.

31. The sensor of claim 23 further comprising a plurality of correction electrodes connected to the substrate and a voltage source to apply a voltage between the plurality of correction electrodes to cause the mass to vibrate, absent the Coriolis force, more precisely along the drive axis.

32. The sensor of claim 23 further comprising a first tuning electrode connected to the substrate and a second tuning electrode connected to the mass, and a voltage source to apply a voltage between the first tuning electrode and the second tuning electrode to adjust a resonant frequency of vibrations of the mass along the sense axis.

33. A microfabricated gyroscopic sensor, comprising:
a substrate;
a mass connected to the substrate by a suspension system;
a drive system to apply an oscillatory force to the mass along a drive axis to cause the mass to vibrate;
a position sensor to measure a deflection of the mass along a sense axis, wherein rotation of the mass about an axis of rotation and vibration of the mass along the drive axis generates a Coriolis force to deflect the mass along the sense axis; and
a voltage source to apply a voltage between electrodes connected to the substrate to cause the mass to vibrate, absent the Coriolis force, more precisely along the drive axis.

34. The sensor of claim 33 further comprising a processor coupled to an output of the position sensor to generate a signal varying with the rate of rotation of the mass about the axis of rotation.

35. The sensor of claim 33 further comprising a second voltage source to apply a second voltage between electrodes connected to the mass and the electrodes connected to the substrate to adjust a resonant frequency of vibrations of the mass along the sense axis.

36. The sensor of claim 33 wherein the position sensor applies an AC voltage between the electrodes connected to the substrate.

37. The sensor of claim 33 wherein the drive axis and sense axis are substantially parallel to a surface of the substrate and the axis of rotation is substantially perpendicular to the surface of the substrate.

38. The sensor of claim 33 wherein the electrodes include:
a first plurality of electrode fingers projecting from the mass substantially along the drive axis;
a second plurality of electrode fingers connected to the substrate and projecting substantially along the drive axis; and
a third plurality of electrode fingers connected to the substrate and projecting substantially along the drive axis, the second and third pluralities of electrode fingers interdigitated with the first plurality of electrode fingers such that each of the first plurality of electrode fingers is adjacent to one of the second plurality of electrode fingers and one of the third plurality of electrode fingers.

39. The sensor of claim 38 wherein the electrodes include:
a fourth plurality of electrode fingers projecting from the mass substantially along the drive axis and positioned opposing the first plurality of electrode fingers;
a fifth plurality of electrode fingers connected to the substrate and projecting substantially along the drive axis and positioned opposing the second plurality of electrode fingers; and
a sixth plurality of electrode fingers connected to the substrate and projecting substantially along the drive axis and positioned opposing the third plurality of electrode fingers, the fifth and sixth pluralities of electrode fingers interdigitated with the fourth plurality of electrode fingers such that each of the fourth plurality of electrode fingers is adjacent to one of the fifth plurality of electrode fingers and one of the sixth plurality of electrode fingers.

40. The sensor of claim 39 wherein the first, second, third, fourth, fifth and sixth pluralities of electrode fingers are substantially co-planar.

41. The sensor of claim 40 wherein the voltage source applies a first DC voltage between the second plurality and the third plurality of electrode fingers, and a second DC voltage between the fifth plurality and the sixth plurality of electrode fingers.

42. The sensor of claim 41 wherein the second DC voltage is substantially equal in magnitude and opposite in sign to the first DC voltage.

43. A method of sensing rotation with a gyroscopic sensor including a mass connected to a substrate by a suspension system, comprising:

rotating the mass about an axis of rotation substantially perpendicular to a surface of the substrate;

applying an oscillating force to the mass along a drive axis which is substantially parallel to the surface of the substrate to cause the mass to vibrate, rotation of the mass about the axis of rotation and vibration of the mass generating a Coriolis force to deflect the mass along a sense axis substantially parallel to the surface of the substrate and substantially perpendicular to the drive axis; and measuring a deflection of the mass along the sense axis.

44. A method of sensing rotation with a gyroscopic sensor including a mass connected to a substrate by a suspension system, comprising:

rotating the mass about an axis of rotation;

applying an oscillatory force to the mass substantially along a drive axis to cause the mass to vibrate, rotation of the mass about the axis of rotation and vibration of the mass along the drive axis generating a Coriolis force to deflect the mass along a sense axis;

measuring a deflection of the mass along the sense axis; and applying a voltage between electrode fingers connected to the substrate to cause the mass to vibrate, absent a Coriolis force, more precisely along the drive axis.

\* \* \* \* \*

UNITED STATES PATENT AND TRADEMARK OFFICE
CERTIFICATE OF CORRECTION

PATENT NO. : 5,992,233
DATED : November 30, 1999
INVENTOR(S) : William A. Clark

It is certified that error appears in the above-identified patent and that said Letters Patent is hereby corrected as shown below:

Claims,

Column 16,
Line 26, delete -- p1 --;

Column 17,
Line 60, delete -- between the --.

Signed and Sealed this

Second Day of October, 2001

Attest:

NICHOLAS P. GODICI
*Attesting Officer*  *Acting Director of the United States Patent and Trademark Office*